United States Patent
Shin

(10) Patent No.: US 10,351,137 B2
(45) Date of Patent: Jul. 16, 2019

(54) APPARATUS AND METHOD FOR CONTROLLING AUTONOMOUS VEHICLE LANE CHANGES

(71) Applicant: Hyundai Motor Company, Seoul (KR)

(72) Inventor: Min Yong Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 111 days.

(21) Appl. No.: 15/482,156

(22) Filed: Apr. 7, 2017

(65) Prior Publication Data

US 2018/0170388 A1    Jun. 21, 2018

(30) Foreign Application Priority Data

Dec. 16, 2016 (KR) .................. 10-2016-0173007

(51) Int. Cl.
*B60W 30/18* (2012.01)
*G05D 1/00* (2006.01)

(52) U.S. Cl.
CPC ..... *B60W 30/18163* (2013.01); *G05D 1/0088* (2013.01); *B60W 2420/42* (2013.01); *B60W 2420/52* (2013.01); *B60W 2550/10* (2013.01); *B60W 2550/30* (2013.01); *B60W 2550/302* (2013.01); *B60W 2550/306* (2013.01); *B60W 2550/308* (2013.01); *B60W 2710/20* (2013.01); *B60W 2750/302* (2013.01); *B60W 2750/306* (2013.01); *B60W 2750/308* (2013.01)

(58) Field of Classification Search
CPC ...... B60W 30/18163; B60W 2550/308; G05D 1/0088
See application file for complete search history.

(56) References Cited

U.S. PATENT DOCUMENTS 8,880,319 B2 * 11/2014 Tsuruta .............. B60W 30/165
701/70
8,914,181 B2 * 12/2014 Essame .......... B60W 30/18163
701/23

(Continued)

FOREIGN PATENT DOCUMENTS

EP    3208786 A1 *  8/2017 ........... B60W 30/16
JP    2002-307973 A   10/2002

(Continued)

OTHER PUBLICATIONS

Kanaris et al., "Strategies and Spacing Requirements for Lane Changing and Merging in Automated Highway Systems", IEEE Transactions on Vehicular Technology, vol. 50 No. 6, Nov. 2001, pp. 1568-1581. (Year: 2001).*

*Primary Examiner* — Todd M Melton
(74) *Attorney, Agent, or Firm* — Morgan, Lewis & Bockius LLP

(57) ABSTRACT

An autonomous driving control apparatus and an autonomous driving control method may include an environment detector detecting vehicle information on one or more vehicles running in a target lane and a processor determining whether a possible lane-change area exists based on the vehicle information, determining a largest area among areas between target lane vehicles as a target lane-change area when the possible lane-change area does not exist, indicating an intention to change a lane to the target lane-change area to determine whether a target lane rear vehicle has an yield intention, and attempting to change the lane based on the determined result.

19 Claims, 11 Drawing Sheets

(56) References Cited

U.S. PATENT DOCUMENTS

| | | | |
|---|---|---|---|
| 9,096,267 B2 | 8/2015 | Mudalige et al. | |
| 9,475,491 B1 * | 10/2016 | Nagasaka | B60W 30/16 |
| 9,718,473 B2 * | 8/2017 | Suzuki | B60W 30/16 |
| 9,884,625 B2 * | 2/2018 | Taira | B60W 30/18163 |
| 2017/0242435 A1 * | 8/2017 | Nilsson | B60W 30/16 |
| 2018/0043935 A1 * | 2/2018 | Hashimoto | B62D 15/0255 |
| 2018/0075751 A1 * | 3/2018 | Bostick | G08G 1/166 |

FOREIGN PATENT DOCUMENTS

| | | |
|---|---|---|
| KR | 10-1439019 B1 | 9/2014 |
| KR | 10-2016-0040913 A | 4/2016 |

\* cited by examiner

AFTER t SECONDS

APPARATUS AND METHOD FOR CONTROLLING AUTONOMOUS VEHICLE LANE CHANGES

CROSS REFERENCE TO RELATED APPLICATION

The present application claims priority to Korean Patent Application No. 10-2016-0173007, filed on Dec. 16, 2016, the entire contents of which is incorporated herein for all purposes by this reference.

BACKGROUND OF THE INVENTION

Field of the Invention

The present invention relates to an apparatus and a method for controlling autonomous driving of a vehicle, which is capable of changing lanes by cutting-in in front of other vehicles in the case that a space enough to change lanes is not secured.

Background

When a driver shows his or her intention to change lanes (e.g., turning on the turn signal), a conventional lane change technology is at the level of determining whether a lane change maneuver is possible within a certain time with respect to a time point at which the driver indicates his or her intention to change lanes and performing the lane change maneuver.

In addition, considering the autonomous driving that is capable of traveling from a current position to a target destination, the autonomous driving is not possible based on the conventional lane change technology. For instance, when an attempt to change lanes continues to fail in a situation where a vehicle intends to enter a junction or an interchange while driving on highway, the vehicle is not capable of entering the junction or the interchange.

To improve the level of an autonomous driving system, assisting drivers, from level 2 (SAE autonomous driving levels) to level 3 in which the autonomous driving system performs a leading role in dynamic driving task, the autonomous driving system is required to perform the lane change maneuver, and an aggressive strategy for the lane change maneuver is needed to make a situation in which the lane change maneuver is possible.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for controlling a vehicle during autonomous driving, which are capable of changing lanes by cutting-in in front of other vehicles even though an area to change lanes is not secured.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an autonomous driving control apparatus includes an environment detector configured to detect vehicle information on one or more vehicles running in a target lane and a processor determining whether a possible lane-change area exists based on the vehicle information, determining a largest area among areas between target lane vehicles as a target lane-change area when the possible lane-change area does not exist, indicating an intention to change a lane to the target lane-change area to determine whether a target lane rear vehicle has an yield intention, and attempting to change the lane based on the determined result.

The vehicle information includes a position, speed, and acceleration of the vehicle running in the target lane.

The processor determines a position of each target lane vehicle based on the vehicle information after a target lane entering time elapses, determines a distance between the target lane vehicles based on the determined position of each target lane vehicle, determines the area between the target lane vehicles as the possible lane-change area when the determined distance between the target lane vehicles is equal to or greater than a critical value, and determines the area between the target lane vehicles as an area impossible to change the lane when the determined distance between the target lane vehicles is smaller than a critical value.

The processor determines the determined possible lane-change area as the target lane-change area when the number of the determined possible lane-change areas is one.

The processor determines a possible lane-change area having the longest length among the determined possible lane-change areas as the target lane-change area when the number of the determined possible lane-change areas is two or more.

The processor generates a virtual target in front of an ego vehicle based on a speed and an acceleration of a center position of the target lane-change area.

The processor deletes the virtual target when the target lane rear vehicle does not have the yield intention.

When the possible lane-change area does not exist, the processor generates a lateral lane position maintaining path in which the ego vehicle moves laterally to a side of the target lane in consideration of a traffic flow in a driving lane of the ego vehicle wherein the ego vehicle runs alongside the target lane or generates a lane intruding path wherein the ego vehicle continuously approaches the target lane.

The processor determines the yield intention based on a deceleration and an acceleration of a front vehicle and a rear vehicle in the target lane-change area.

The processor returns the ego vehicle to the center of a driving lane of the ego vehicle when the yield intention does not exist and controls a driving speed of the ego vehicle to search for another target lane-change area.

According to another aspect of the present invention, an autonomous driving control method includes detecting vehicle information on one or more vehicles running in a target lane, determining whether a possible lane-change area exists based on the vehicle information, determining a largest area among areas between target lane vehicles as a target lane-change area when the possible lane-change area does not exist, indicating an intention to change a lane to the target lane-change area to a target lane rear vehicle, determining whether the target lane rear vehicle has an yield intention, and attempting to change the lane based on the determined result of the yield intention.

Detecting the vehicle information includes detecting a position, speed, and acceleration of the vehicle running in the target lane using radar and a camera.

Determining the target lane-change area includes determining a position of each target lane vehicle based on the vehicle information after a target lane entering time elapses, determining a distance between the target lane vehicles based on the determined position of each target lane vehicle, determining the area between the target lane vehicles as the possible lane-change area when the determined distance between the target lane vehicles is equal to or greater than a critical value, and determining the area between the target lane vehicles as an area impossible to change the lane when the determined distance between the target lane vehicles is smaller than a critical value.

Determining the target lane-change area includes determining the determined possible lane-change area as the target lane-change area when the number of the determined possible lane-change areas is one.

Determining the target lane-change area includes determining a possible lane-change area having the longest length among the determined possible lane-change areas as the target lane-change area when the number of the determined possible lane-change areas is two or more.

Indicating the intention to change the lane to the target lane rear vehicle includes generating a virtual target in front of an ego vehicle based on a speed and an acceleration of a center position of the target lane-change area, controlling the speed of the ego vehicle wherein the ego vehicle runs parallel to a center of the target lane-change area by following the virtual target, generating a cut-in intention path to the target lane-change area, and performing a lateral control on the ego vehicle based on the cut-in intention path.

Generating the cut-in intention path includes generating a lateral lane position maintaining path in which the ego vehicle moves laterally to a side of the target lane in consideration of a traffic flow in a driving lane of the ego vehicle wherein the ego vehicle runs alongside the target lane or generating a lane intruding path wherein the ego vehicle continuously approaches the target lane.

Determining the yield intention includes determining the yield intention based on a deceleration and an acceleration of a front vehicle and a rear vehicle in the target lane-change area.

Determining the yield intention includes deleting the virtual target when the target lane rear vehicle does not have the yield intention, returning the ego vehicle to a center of a driving lane of the ego vehicle, and controlling a driving speed of the ego vehicle to search for another target lane-change area.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
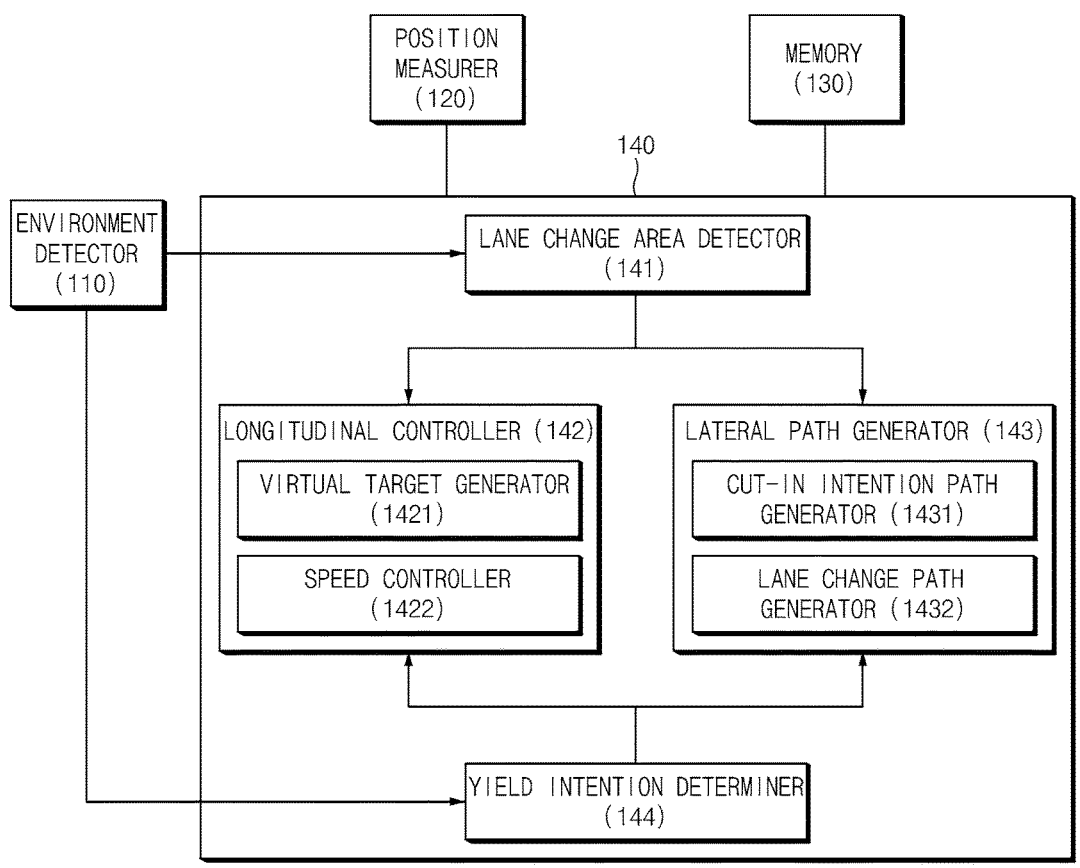
FIG. 1 is a block diagram illustrating an autonomous driving control apparatus according to an exemplary embodiment of the present invention.

It should be understood that the appended drawings are not necessarily to scale, scale presenting a somewhat simplified presentation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will be now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, unless explicitly described to the contrary, it will be understood that the terms "comprise" "constitute", and/or "include" specify the presence of stated components, but do not preclude the presence or addition of one or more other components.

In addition, the terms such as "part", "section", "module", etc., which are described in the specification, mean a unit of a comprehensive configuration that performs at least one function or operation, and is implemented by hardware or software or a combination of hardware and software. In addition, the "one", "a(an)" and "the(said)" used herein in single forms are intended to include the plural forms as well, unless the context clearly indicates otherwise.

Hereinafter, exemplary embodiments of the present invention will be described in detail with reference to accompanying drawings.

The present invention relates to a method of searching for a space in which a lane change is possible and securing the space to perform the lane change when the lane change is performed automatically. In particular, the present invention suggests a method of performing a cut-in maneuver during heavy traffic using an autonomous driving mode.

The present invention improves a lane change probability by actively showing an intention of changing lanes or cutting-in to a rear vehicle running in a target lane and verifying a yield intention of the rear vehicle when it is necessary to change lanes within a certain time period.

Figure 2:
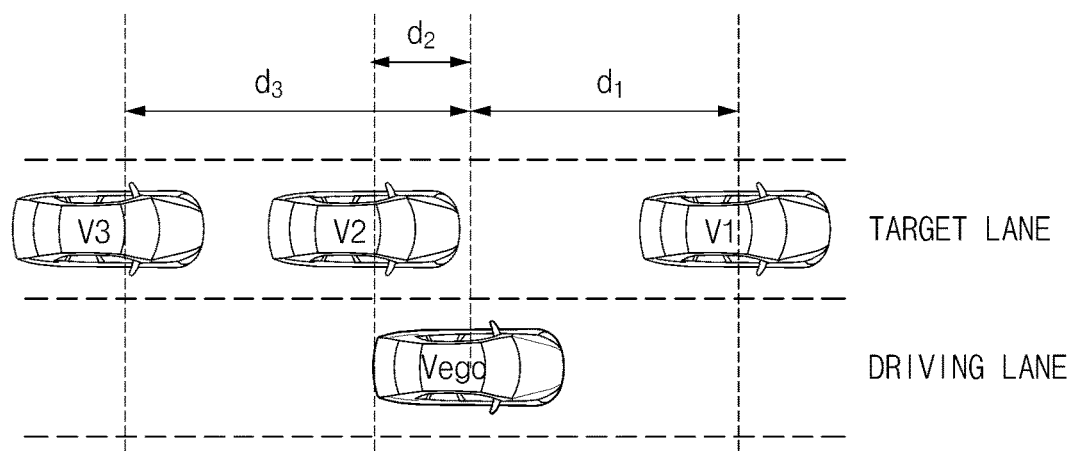
FIG. 2 is a view illustrating a method of predicting positions of vehicles running in a target lane according to an exemplary embodiment of the present invention.
Figure 2:
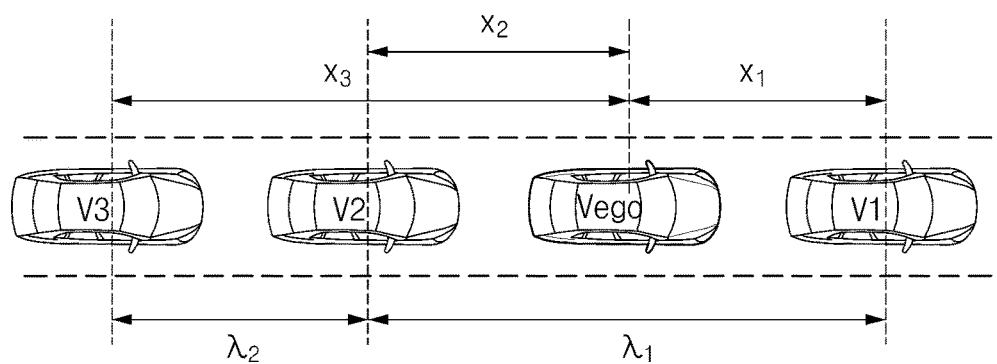
Figure 3:
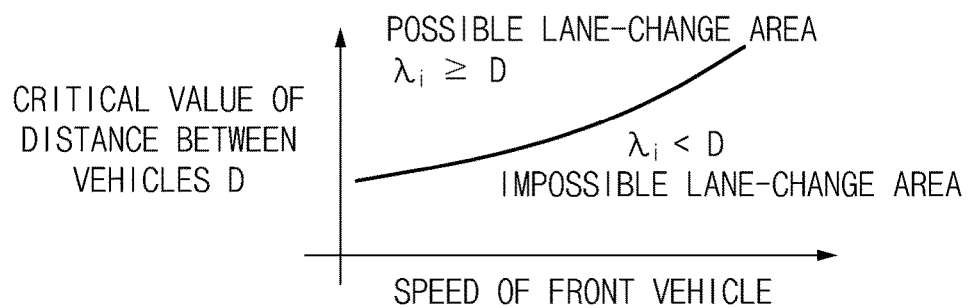
FIG. 3 is a graph illustrating the relation between a critical value in distance between vehicles in a target lane and a speed of a front vehicle in the target lane according to an exemplary embodiment of the present invention.
Figure 4:
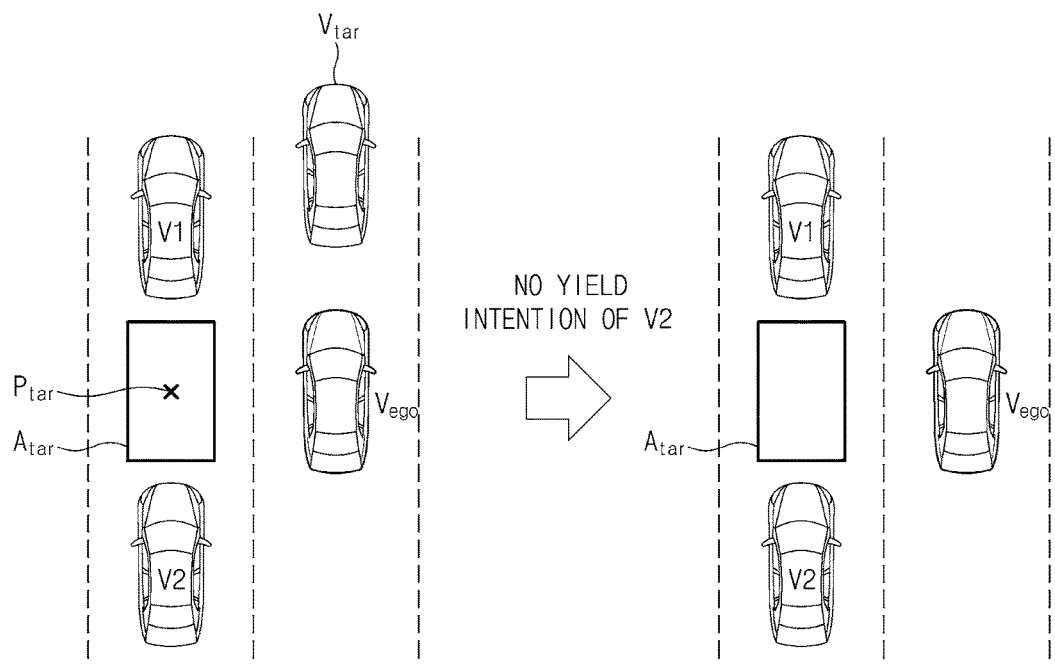
FIG. 4 is a view illustrating a method of generating and deleting a target vehicle according to an exemplary embodiment of the present invention.
Figure 5:
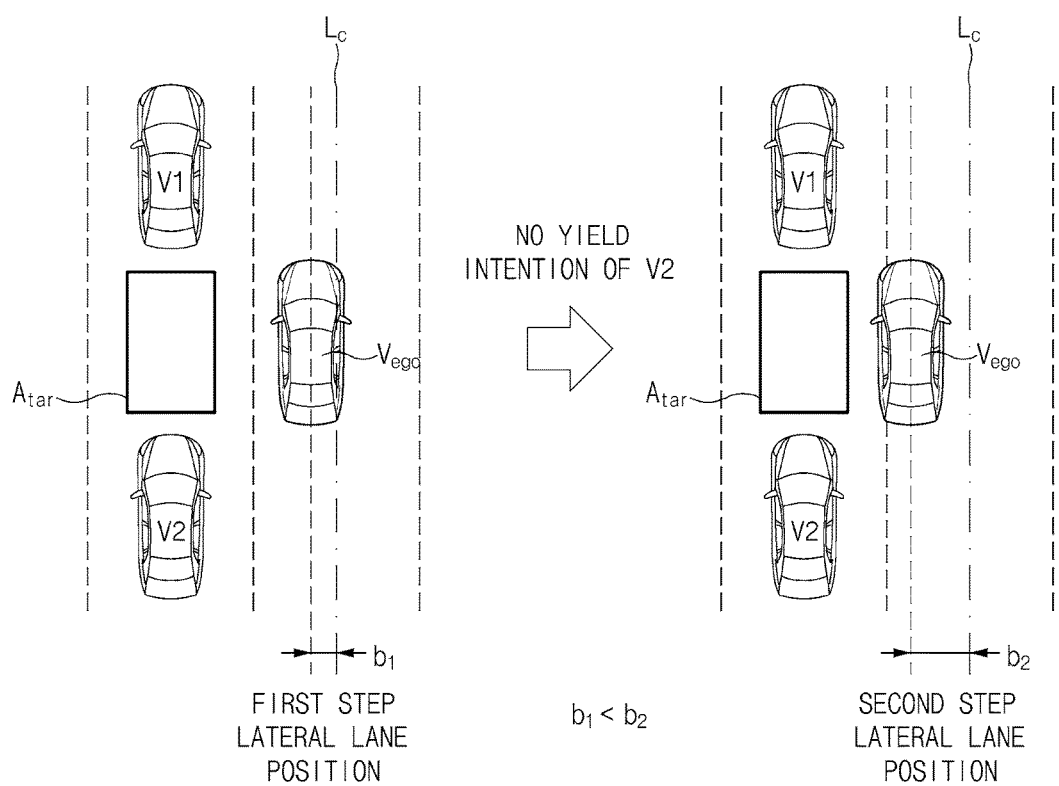
FIG. 5 is a view illustrating a method of generating a lateral lane position maintaining path according to an exemplary embodiment of the present invention.
Figure 6:
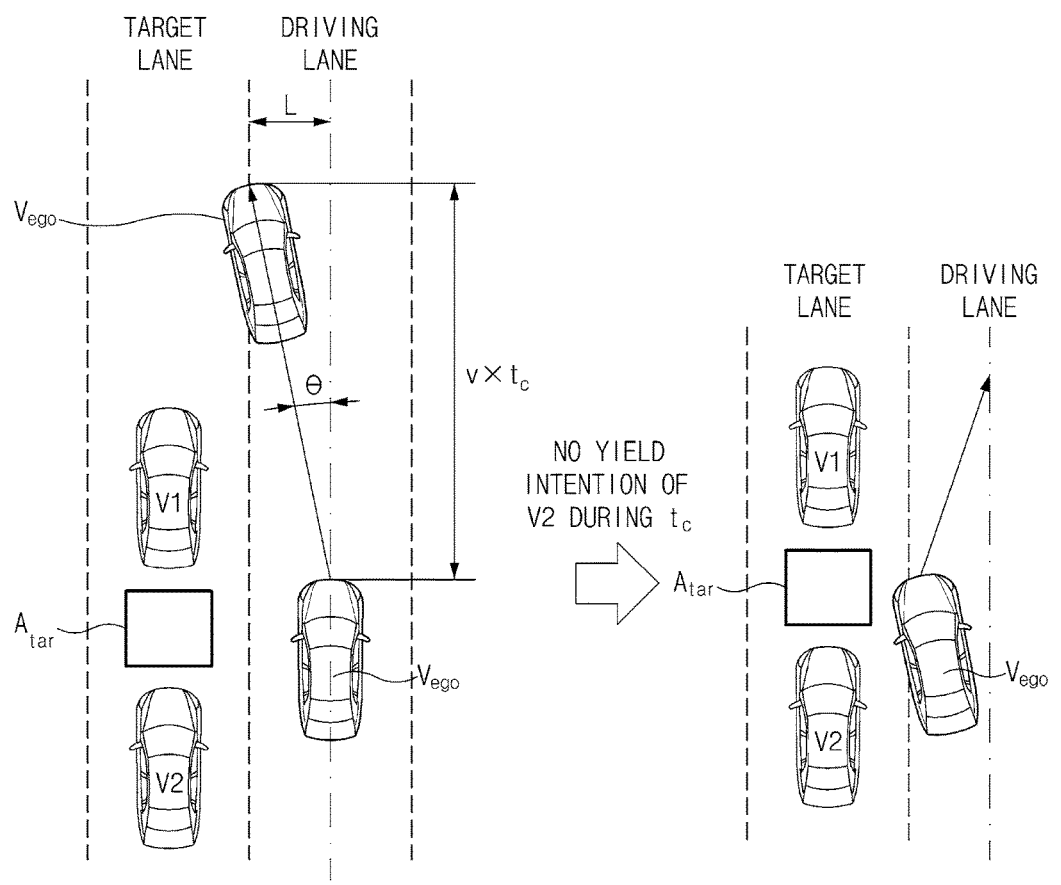
FIG. 6 is a view illustrating a method of generating a lane intruding path according to an exemplary embodiment of the present invention.

FIG. 1 is a block diagram illustrating an autonomous driving control apparatus according to an exemplary embodiment of the present invention, FIG. 2 is a view illustrating a method of predicting positions of vehicles running in a target lane according to an exemplary embodiment of the present invention, FIG. 3 is a graph illustrating a relation between a critical value in distance between vehicles in a target lane and a speed of a front vehicle in the target lane according to an exemplary embodiment of the present invention, FIG. 4 is a view illustrating a method of generating and deleting a target vehicle according to an exemplary embodiment of the present invention, FIG. 5 is a view illustrating a method of generating a lateral lane position maintaining path according to an exemplary embodiment of the present invention, and FIG. 6 is a view illustrating a method of generating a lane intruding path according to an exemplary embodiment of the present invention.

As shown in FIG. 1, the autonomous driving control apparatus includes an environment detector (environment sensors) 110, a position measurer 120, a memory 130, and a processor 140.

The environment detector 110 detects one or more nearby vehicles located at front, side, and rear positions of an ego vehicle and detects a position, speed, and acceleration of each nearby vehicle. The environment detector 110 detects vehicles (hereinafter, referred to as target lane vehicles) running in a target lane into which the ego vehicle wants to change. The environment detector 110 may recognize one or more target lane vehicles, which are positioned within a detection range of the environment detector 110.

The environment detector 110 may include at least one of a radio detecting and ranging (RADAR), a light detection and ranging (LiDAR), an ultrasonic sensor, or a camera, which is disposed at each of the front, side, and rear positions.

The camera obtains an image around the ego vehicle using an image sensor. The camera may include an image processor that performs an image processing, e.g., a noise removal, a color reproduction, an image quality control, a saturation adjustment, a file compression, etc., on the obtained image.

The RADAR determines a distance between the ego vehicle and the nearby vehicles (including the target lane vehicles). The RADAR irradiates an electromagnetic wave on the nearby vehicles and receives the electromagnetic wave reflected by the nearby vehicles to verify a distance from the nearby vehicles, a direction of movement of the nearby vehicles, and an altitude of the nearby vehicles.

The LiDAR determines a distance between the ego vehicle and the nearby vehicles. The LiDAR applies a laser pulse to the nearby vehicles and determines a time until the laser pulse reflected by the nearby vehicles reaches the LiDAR to determine a spatial position coordinate of a reflection point of the laser pulse. Accordingly, the distance between the ego vehicle and the nearby vehicles and a shape of the nearby vehicles may be verified.

The ultrasonic sensor generates an ultrasonic wave to detect the nearby vehicles and to determine the distance between the ego vehicle and the nearby vehicles.

The position measurer 120 determines a current position of the ego vehicle. The position measurer 120 may be implemented by a global positioning system (GPS) module. The GPS module 120 determines the current position of the ego vehicle using signals provided from three or more GPS satellites. The GPS module 120 determines a distance between the satellites and the GPS module 120 using a difference in time between a time point at which the satellites transmit the signals and a time point at which the GPS module 120 receives the signals. The GPS module 120 determines the current position of the ego vehicle using the determined distance between the satellites and the GPS module 120 and position information of the satellites, which are included in the transmitted signals. In the present case, the GPS module 120 determines the current position of the ego vehicle using a triangulation method.

The memory 130 may store detailed map data and a program to control an operation of the processor 140. The memory 130 may be implemented by at least one storage of a flash memory, a hard disk, a secure digital (SD) card, a random access memory (RAM), a read only memory (ROM), or a web storage.

The processor 140 receives information (hereinafter, referred to as "target lane vehicle information" on each of the target lane vehicles from environment detector 110. The target lane vehicle information may include a position, speed, and acceleration of the vehicles in the target lane. The processor 140 searches for the space (hereinafter, referred to as a "possible lane-change area") in which the lane change is possible based on the target lane vehicle information. When the possible lane-change area is searched, the processor 140 controls the speed of the ego vehicle to allow the ego vehicle to be positioned parallel to the possible lane-change area and performs a control for the lane change.

When the processor 140 continues to fail to find space in which the lane change is possible, the processor 140 searches for spaces between the target lane vehicles, allows the ego vehicle to be positioned parallel to the greatest space among the searched spaces, and attempts to move laterally to a side of the target lane and drive along the target lane. The processor 140 verifies a yield intention of the rear vehicle running in the target lane (hereinafter, referred to as a "the target lane rear vehicle". In the case that the space to change lanes is secured by the yield of the target lane rear vehicle, the processor 140 attempts to change lanes. On the contrary, in the case that the target lane rear vehicle does not yield and the space to change lanes is not secured, the processor 140 reduces the speed of the ego vehicle to search for another space.

The processor 140 includes a lane change area detector 141, a longitudinal controller 142, a lateral path generator 143, and a yield intention determiner (yield intention decision) 144.

The lane change area detector 141 searches for the space for the lane change or a cut-in in the target lane into which the ego vehicle wants to move. That is, the lane change area detector 141 searches for a space (hereinafter, referred to as "a possible lane-change area") pin which the lane change to the target lane is possible and a space in which the cut-in is possible.

The lane change area detector 141 predicts (determines) a position $(X_i)$ of one or more target lane vehicles based on the position, speed, and acceleration of the one or more target lane vehicles after an entering time (t seconds) to the target lane (hereinafter, referred to as a "the target lane entering time" elapses. The target lane entering time indicates a time spent to allow the ego vehicle to enter the target lane.

As shown in FIG. 2, in the case that the ego vehicle intends to change lanes from a current driving lane to a left lane of the current driving lane with respect to the driving direction of the ego vehicle, the position $x_i$ (i.e., distances between a center of the ego vehicle and a center of each target lane vehicle) of each of the target lane vehicles V1, V2, and V3 after the target lane entering time (t seconds) may be determined by the following Equation 1.

$$x_i = d_i + v_i t + \frac{1}{2} a_i t^2 \qquad \text{Equation 1}$$

In Equation 1, $d_i$ denotes an initial distance between the ego vehicle and an i-th target lane vehicle, $v_i$ denotes a speed of the i-th target lane vehicle, and $a_i$ denotes an acceleration of the i-th target lane vehicle.

The lane change area detector 141 determines distances between the target lane vehicles based on the positions of the one or more target lane vehicles after the target lane entering time. For instance, in the case that the distances between the target lane vehicles V1, V2, and V3 after the target lane entering time are respectively $x_1$, $x_2$, and $x_3$ as shown in FIG. 2, the lane change area detector 141 determines a distance $\lambda_1$ between the target lane vehicles V1 and V2 and a distance $\lambda_2$ between the target lane vehicles V2 and V3 by following Equation 2.

$$\lambda_1 = x_1 - x_2$$
$$\lambda_2 = x_2 - x_3 \qquad \text{Equation 2}$$

The lane change area detector 141 determines whether the possible lane-change area exists. When the distance between two target lane vehicles is equal to or greater than a critical value D, the lane change area detector 141 determines that the possible lane-change area exists. When the distance between two target lane vehicles is smaller than the critical value D, the lane change area detector 141 determines that the possible lane-change area does not exist. The critical value D is changed depending on a speed of a front running vehicle of the two target lane vehicles as shown in FIG. 3.

The lane change area detector 141 determines a target lane-change area (target space) based on the distances between the target lane vehicles. The lane change area detector 141 takes into account the distance $\lambda_i$ between the target lane vehicles (a length of the target lane-change area) and a distance change rate $\dot{\lambda}_i^*$ after the target lane entering time (t seconds) to determine the target lane-change area. The lane change area detector 141 determines the target lane-change area based on a maximum function value $\Phi^{\ddagger}$ of a weighted sum $\Phi$ of the distance $\lambda_i$ and the distance change rate $\dot{\lambda}_i^*$ after the target lane entering time (t seconds).

$$\Phi^* = \max_i \Phi(\lambda_i, \dot{\lambda}_i) \qquad \text{Equation 3}$$
$$\Phi(\lambda_i, \dot{\lambda}_i) = w_1 \lambda_i + w_2 \dot{\lambda}_i$$

In Equation 3, each of $w_1$ and $w_2$ denotes a weighted value and is arbitrarily defined by a developer (a user).

The lane change area detector 141 determines an area in which a function value of $\Phi(\lambda_i, \dot{\lambda}_i^*)$ is maximized as the target lane-change area in the case that multiple possible lane-change areas exist. In the case that one possible lane-change area exists, the lane change area detector 141 determines the one possible lane-change area as the target lane-change area. The lane change area detector 141 determines an area in which the function value of $\Phi(\lambda_i, \dot{\lambda}_i^*)$ is maximized among the areas (spaces) between the target lane vehicles as the target lane-change area in the case that no possible lane-change area exists.

In the case that three possible lane-change areas (possible vehicle entry areas) exist, the lane change area detector 141 obtains the function value $\Phi$ to which linear weights of $\lambda_i$ and $\dot{\lambda}_i^*$ of each of the possible lane-change areas are added when the length of the possible lane-change area and a length change rate (the distance change rate) are $(\lambda_1, \dot{\lambda}_1^*)$, $(\lambda_2, \dot{\lambda}_2^*)$, and $(\lambda_3, \dot{\lambda}_3^*)$. The lane change area detector 141 determines the possible lane-change area having the maximum function value $\Phi^{\ddagger}$ among the function values $\Phi$ of the possible lane-change areas as the target lane-change area.

The lane change area detector 141 determines a position, speed, and acceleration of a center position of the determined target lane-change area.

The longitudinal controller 142 includes a virtual target generator 1421 and a speed controller 1422.

The virtual target generator 1421 generates a virtual target used for an adaptive cruise control (ACC) wherein the ego vehicle is located at a position of the target lane-change area provided by the lane change area detector 141 regardless of the existence of the possible lane-change area.

The virtual target generator 1421 generates the virtual target for the use of the ACC in consideration of the speed and acceleration (the speed and acceleration of the center position of the target lane-change area) output from the lane change area detector 141. Here, an ACC system regards the virtual vehicle and the front vehicle of the ego vehicle as the target and determines the acceleration of the ego vehicle to correspond to each of the virtual vehicle and the front vehicle of the ego vehicle.

The virtual target generator 1421 deletes the virtual target when the yield intention determiner 144 determines that no yield intention exists. As shown in FIG. 4, the virtual target generator 1421 generates the virtual target $V_{tar}$ in front of the ego vehicle $V_{ego}$ wherein the ego vehicle $V_{ego}$ is positioned parallel to the position $P_{tar}$ of the target lane-change area $A_{tar}$ and deletes the virtual target $V_{tar}$ when the target lane rear vehicle V2 has no intention to yield.

The speed controller 1422 searches for another space by changing the speed of the ego vehicle. The speed controller 1422 changes the speed of the ego vehicle to search for another space when the yield intention determiner 144 determines that the target lane rear vehicle does not have the yield intention.

The speed controller 1422 takes into account an average speed $V_{tar}$ of one or more target lane vehicles, which are recognizable, the existence of the front vehicle of the ego vehicle, and the speed $V_{front}$ of the front vehicle to determine the speed of the ego vehicle $V_{ego}$.

Case 1: when the front vehicle exists and $V_{tar} < V_{front}$, $V_{ego} = V_{front}$ Case 2: when the front vehicle exists and $V_{tar} > V_{front}$, $V_{ego} = V_{front}$ Case 3: when the front vehicle exists and $V_{tar} = V_{front}$, $V_{ego} = V_{front} - 5$ kph Case 4: when the front vehicle does not exist, $V_{ego} = V_{front} - 5$ kph The lateral path generator 143 includes a cut-in intention path generator 1431 and a lane change path generator 1432.

When the lane change area detector 141 determines that no possible lane-change area exists, the cut-in intention path generator 1431 attempts to indicate that the ego vehicle has an intention to change the lane or to cut in to the target lane rear vehicle.

The cut-in intention path generator 1431 generates a lateral lane position maintaining path in which the ego vehicle moves laterally to a side of the target lane where in the ego vehicle runs alongside the target lane or a lane intruding path through which the ego vehicle continuously and slowly approaches the target lane, indicating the cut-in intention.

The cut-in intention path generator 1431 generates the lateral lane position maintaining path when a traffic flow is fast and generates the lane intruding path when the traffic flow is slow.

The cut-in intention path generator 1431 determines the traffic flow using the average speed of the nearby vehicles (e.g., the front and rear vehicles of the ego vehicle).

TABLE 1

| | Lateral lane position maintaining path | Lane intruding path |
|---|---|---|
| Speed of the traffic flow | $\dfrac{\sum_{i} v_i}{n} \geq V$ | $\dfrac{\sum_{i} v_i}{n} < V$ |

Here, "i" denotes 1, 2, . . . , n, "n" denotes a total number of the nearby vehicles, and "V" denotes a critical speed (a reference speed) for the selection of path.

The cut-in intention path generator 1431 generates the lateral lane position maintaining path positioned laterally close to the target lane to indicate the cut-in intention to the rear vehicle. The lateral lane position maintaining path is substantially parallel to a path indicating a center of the driving lane of the ego vehicle. The lateral lane position maintaining path is generated through two steps.

As shown in FIG. 5, the cut-in intention path generator 1431 generates a first step lateral lane position maintaining path that moves to the target lane by a first distance b1 from the center of the driving lane. In the case that the yield intention of the rear vehicle remains unknown even though the ego vehicle drives along the first step lateral lane position maintaining path, the cut-in intention path generator 1431 generates a second step lateral lane position maintaining path that moves to the target lane by a second distance b2 from the center of the driving lane.

The cut-in intention path generator 1431 generates the lane intruding path that slowly intrudes the target lane to indicate the cut-in intention to the rear vehicle. The lane intruding path is slant to the target lane by a heading angle θ from the center of the driving lane of the ego vehicle. Due to the heading angle θ determined in consideration of a current driving speed, the ego vehicle intrudes the target lane after $t_c$ seconds.

For instance, as shown in FIG. 6, the heading angle θ of the ego vehicle is determined by the following Equation 4.

$$\theta = \arctan\left(\dfrac{L}{v \times t_c}\right) \quad \text{Equation 4}$$

In Equation 4, "L" denotes a distance between the center in width of the ego vehicle and a line of the lane (which is closer to the ego vehicle of both lines defining the target lane) to which the ego vehicle has the intention to cut in, and $v \times t_c$ denotes a distance in which the ego vehicle moves during the $t_c$ seconds.

The cut-in intention path generator 1431 determines the yield intention of the rear vehicle during the $t_c$ seconds. In the case that it is impossible to determine the yield intention during the $t_c$ seconds or it is determined that the rear vehicle has no intention to yield, the ego vehicle returns to the center of the driving lane.

The cut-in intention path generator 1431 generates a path through which the ego vehicle returns to the center of the driving lane when the target lane rear vehicle has no intention to yield during a predetermined time period.

The lane change path generator 1432 generates a lane change path from the position of the ego vehicle in a lane center driving state, a first step lateral lane position driving state, or a second step lateral lane position driving state to the center of the target lane.

The yield intention determiner 144 determines the yield intention based on deceleration and acceleration of the front and rear vehicles of the target lane-change area (target space). In the case that the lane change area detector 141 determines that no possible lane-change area exists, the yield intention determiner 144 verifies the yield intention of the target lane rear vehicle while the ego vehicle drives along the lateral lane position next to the greatest space among the spaces between the target lane vehicles.

The yield intention determiner 144 determines an expansion or shrinkage rate of the target space (a length change rate of the target space) based on the deceleration and/or the acceleration of the front and rear vehicles in the target space. As shown in Table 2, the yield intention determiner 144 determines that there is the yield intention when the target space is expanding and determines that there is no yield intention when the target space is shrinking. In addition, the yield intention determiner 144 determines that it is impossible to determine the yield intention when the length of the target space is not changed.

TABLE 2

| Determination reference | Determination result |
|---|---|
| $\dot{\lambda} > 0 + \varepsilon$ | showing yield intention |
| $\dot{\lambda} < 0 - \varepsilon$ | showing no yield intention |
| $0 - \varepsilon \leq \dot{\lambda} \leq 0 + \varepsilon$ | pending determination of the yield intention |

In Table 2, εn denotes a margin defined by the developer and is set to an arbitrary constant value.

Figure 7:
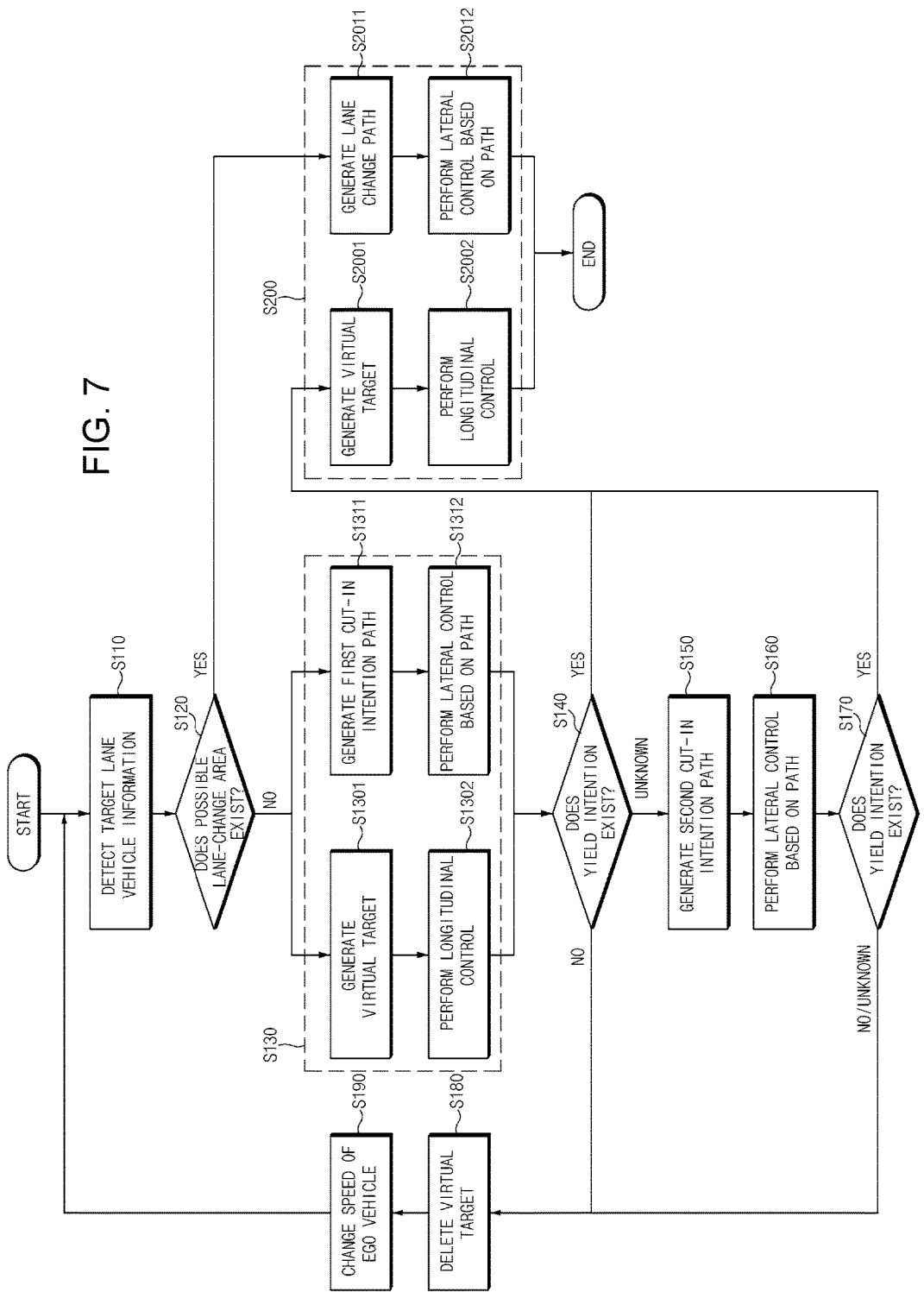
FIG. 7 is a flowchart illustrating an autonomous driving control method according to an exemplary embodiment of the present invention.

FIG. 7 is a flowchart illustrating an autonomous driving control method according to an exemplary embodiment of the present invention.

The processor 140 detects information on one or more target lane vehicles (hereinafter, referred to as "target lane vehicle information") via the environment detector 110 (S110). The target lane vehicles mean the vehicles running in the target lane into which the ego vehicle wants to change. The target lane vehicle information includes the positions, speeds, and accelerations of the target lane vehicles.

The processor 140 determines whether one or more possible lane-change areas exist based on the target lane vehicle information (S120). In the case that the distance between the target lane vehicles (i.e., the length of the area between the target lane vehicles) is equal to or greater than the critical value, the processor 140 determines that the possible lane-change area exists. In the case that the distance between the target lane vehicles is smaller than the critical value, the processor 140 determines that the possible lane-change area does not exist.

In the case that one possible lane-change area exists, the processor 140 determines the one possible lane-change area to the target lane-change area, and in the case that two or more possible lane-change areas exist, the processor 140 determines one possible lane-change area having the longest length among the two or more possible lane-change areas to the target lane-change area.

In the case that the possible lane-change area does not exist, the processor 140 determines an area (a maximum area) having the longest length among areas (spaces) between the target lane vehicles to the target lane-change area.

In the case that the target lane-change area is determined, the processor 140 outputs the position, the speed, and the acceleration of the center of the determined target lane-change area.

In the case that the possible lane-change area does not exist, the processor 140 generates the virtual target in front of the ego vehicle to perform the longitudinal control on the ego vehicle and generates a first cut-in intention path to perform the lateral control on the ego vehicle (S130).

In the case that the possible lane-change area does not exist, the processor 140 generates the virtual target based on the position and the speed of the center of the target lane-change area (S1301).

The processor 140 is configured to control the driving speed of the ego vehicle to correspond to a driving speed of the virtual target (S1302). The processor 140 performs the longitudinal control on the ego vehicle wherein the ego vehicle is positioned parallel to the target lane-change area.

When the possible lane-change area does not exist, the processor 140 generates the first cut-in intention path (S1311). The first cut-in intention path is a lateral path to show the cut-in intention of the ego vehicle. The processor 140 generates the lateral lane position maintaining path or the lane intruding path depending on a traffic situation.

The processor 140 performs the lateral control on the ego vehicle based on the generated first cut-in intention path (S1312).

The processor 140 determines whether the target lane rear vehicle has the yield intention after indicating the first cut-in intention of the ego vehicle (S140). The processor 140 determines the yield intention of the target lane rear vehicle based on the deceleration or acceleration of the target lane rear vehicle.

The processor 140 generates a second cut-in intention path in the case that the processor 140 is not capable of determining whether the target lane rear vehicle has the yield intention (S150).

The processor 140 performs the lateral control on the ego vehicle based on the generated second cut-in intention path (S160).

The processor 140 determines whether the target lane rear vehicle has the yield intention after indicating the second cut-in intention of the ego vehicle (S170).

In the case that it is determined that the target lane rear vehicle does not have the yield intention in operation S140 or it is determined that the processor 140 is not capable of determining whether the target lane rear vehicle has the yield intention in operation S170, the processor 140 deletes the generated virtual target (S180).

The processor 140 changes the speed of the ego vehicle after deleting the virtual target (S190). The processor 140 controls the speed of the ego vehicle to search for another space. In the case that the front vehicle exists, the processor 140 changes the speed of the ego vehicle to be smaller than the driving speed of the front vehicle. In the case that the front vehicle does not exist, the processor 140 changes the speed of the ego vehicle in consideration of an average speed (a target lane driving speed) of the vehicle, which is recognizable and drives in the target lane, and a speed set by the driver.

In the case that it is determined that the possible lane-change area exists in operation S120, the processor 140 generates the virtual target in front of the ego vehicle to perform the longitudinal control on the ego vehicle and generates the lane change path to perform the lateral control on the ego vehicle (S200).

The processor 140 generates the virtual target based on the position, the speed, and the acceleration of the center of the target lane-change area, which are output from the lane change area detector 141 (S2001).

The processor 140 controls the driving speed of the ego vehicle based on the driving speed of the virtual target to perform the longitudinal control on the ego vehicle (S2002).

The processor 140 generates the lane change path from the position of the ego vehicle in the current driving state to the target lane-change area (S2011). The current driving state of the ego vehicle may be the state in which the ego vehicle drives in the center of the driving lane, the first step lateral lane position driving state, or the second step lateral lane position driving state.

The processor 140 performs the lateral control on the ego vehicle based on the lane change path (S2012). The processor 140 changes the lane, on which the ego vehicle travels, based on the lane change path.

Figure 8:
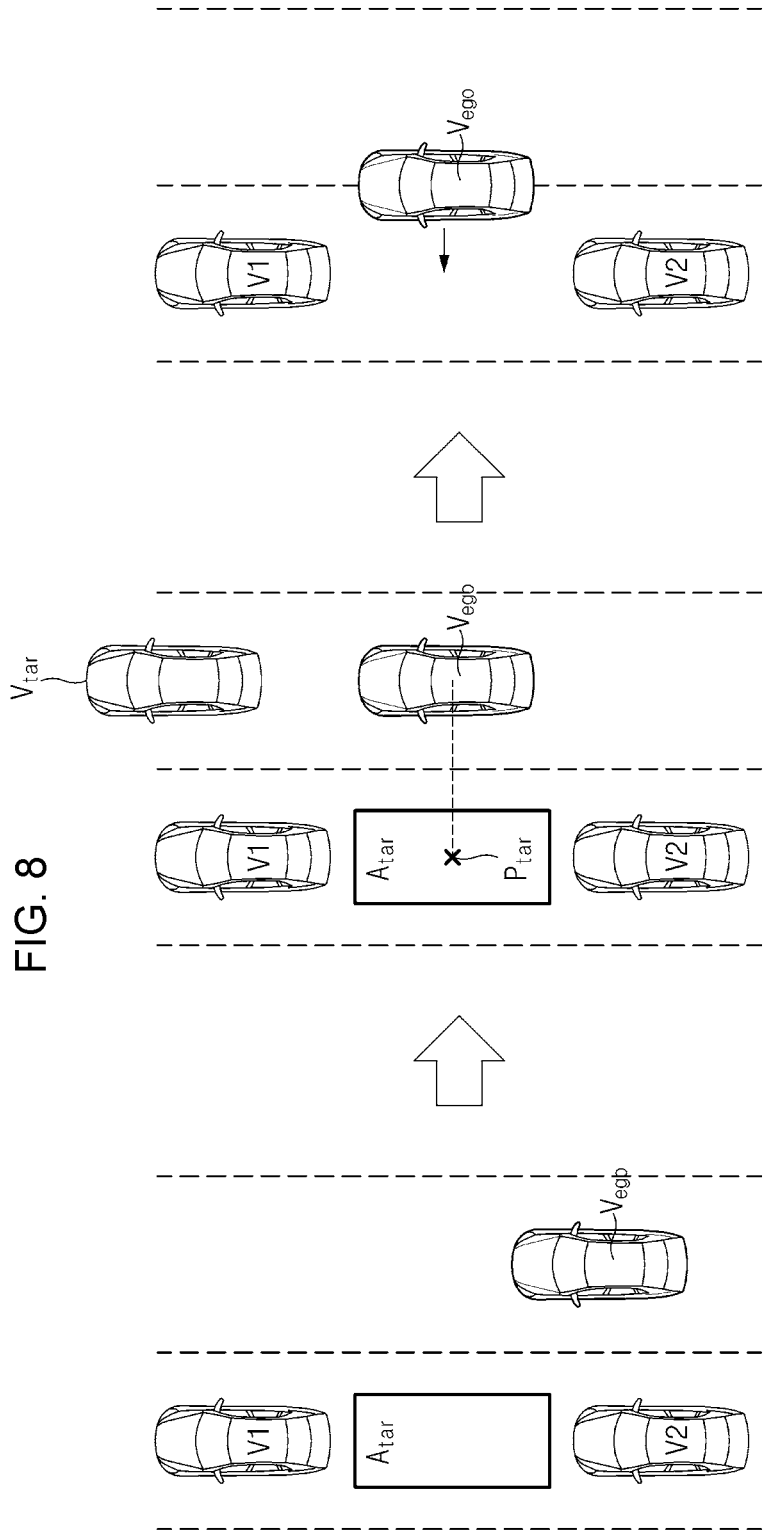
FIG. 8 is a view showing a lane change when a possible lane-change area exists according to an exemplary embodiment of the present invention.

FIG. 8 is a view showing the lane change when the possible lane-change area exists according to an exemplary embodiment of the present invention.

The ego vehicle $V_{ego}$ searches for the possible lane-change area in the target lane and determines the possible lane-change area as the target lane-change area $A_{tar}$. The ego vehicle $V_{ego}$ determines the space between the vehicles V1 and V2 running in the target lane as the target lane-change area $A_{tar}$.

The ego vehicle $V_{ego}$ moves to be positioned parallel to the target lane-change area $A_{tar}$ and maintains the driving speed. In the instant case, the ego vehicle $V_{ego}$ follows the virtual target $V_{tar}$ positioned in front of the ego vehicle $V_{ego}$. The ego vehicle $V_{ego}$ generates the lane change path between a current position of the ego vehicle and the target lane-change area.

The ego vehicle $VegoV_{ego}$ performs the lane change along the lane change path.

Figure 9:
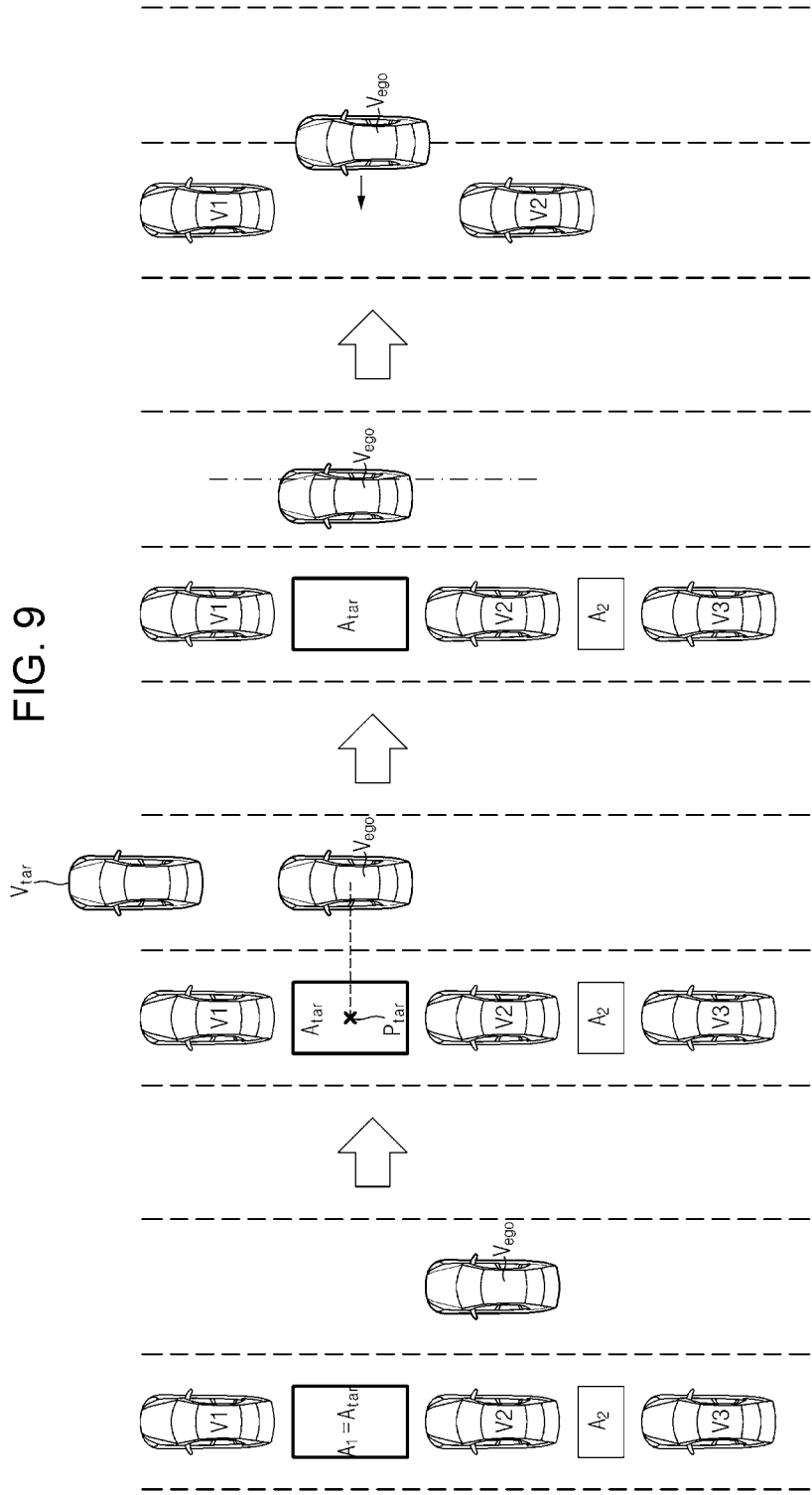
FIG. 9 is a view showing a lane change when a possible lane-change area does not exist according to an exemplary embodiment of the present invention.

FIG. 9 is a view showing the lane change when the possible lane-change area does not exist according to an exemplary embodiment of the present invention.

In the case that the possible lane-change area does not exist in the target lane, the ego vehicle $V_{ego}$ determines the largest space among the spaces (areas) between the target lane vehicles as the target lane-change area $A_{tar}$. The ego vehicle $V_{ego}$ determines the space $A_1$ between the vehicles V1 and V2 as the target lane-change area $A_{tar}$ among the space $A_1$ between the vehicles V1 and V2 and the space $A_2$ between the vehicles V2 and V3.

The ego vehicle $V_{ego}$ follows the virtual target $V_{tar}$ and controls the driving speed of the ego vehicle $V_{ego}$ where in the center of the target lane-change area $A_{tar}$ is parallel to the center of the ego vehicle $V_{ego}$. In other words, the ego vehicle $V_{ego}$ moves to the position parallel to the target lane-change area $A_{tar}$ by following the virtual target $V_{tar}$ and maintains the driving speed.

The ego vehicle $V_{ego}$ drives toward the direction of the target lane with the lateral lane position while turning on a turn signal. That is, the ego vehicle $V_{ego}$ moves laterally to the side of the target lane by a predetermined distance from the center of the driving lane of the ego vehicle and drives alongside the target lane.

In the case that the vehicle V2 positioned at a rear position of the target lane-change area $A_{tar}$ shows the yield intention, the ego vehicle $V_{ego}$ secures the space for the lane change and generates the lane change path. The ego vehicle $V_{ego}$ attempts to change the lane along the generated lane change path.

Figure 10A:
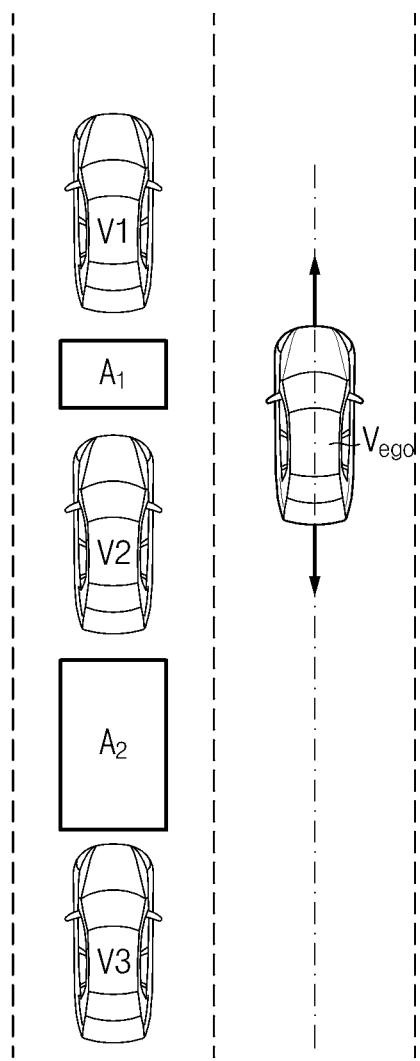
FIG. 10A is a view showing a process of retrying to change a lane when the lane change fails according to an exemplary embodiment of the present invention.
Figure 10B:
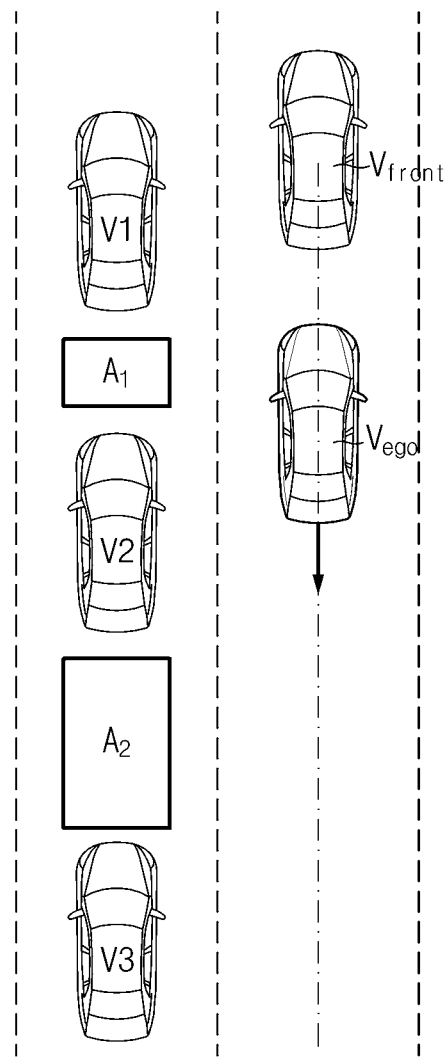
FIG. 10B is a view showing a process of retrying to change a lane when the lane change fails according to another exemplary embodiment of the present invention.

FIG. 10A is a view showing a process of retrying to change a lane when the lane change fails according to an exemplary embodiment of the present invention, and FIG. 10B is a view showing a process of retrying to change a lane when the lane change fails according to another exemplary embodiment of the present invention.

In the case that it is determined that the vehicle V2 running in the target lane does not have the yield intention while the ego vehicle $V_{ego}$ attempts to cut-in to the area $A_1$, the ego vehicle $V_{ego}$ returns to the center of the driving lane. Then, in the case that a vehicle does not exist in front of the ego vehicle $V_{ego}$ as shown in FIG. 10A, the ego vehicle $V_{ego}$ decelerates or accelerates the driving speed of the ego vehicle $V_{ego}$ to search for another space.

Meanwhile, in the case that a vehicle exists in front of the ego vehicle $V_{ego}$ as shown in FIG. 10B, the ego vehicle $V_{ego}$ decelerates the driving speed of the ego vehicle $V_{ego}$ to search for another space.

In the above, even though it is described that all the components configuring the exemplary embodiment of the present invention as described above are coupled as one or are operated by being coupled with each other, the present invention is not necessarily limited to the exemplary embodiments. That is, all the components may be operated by being optionally coupled with each other within the scope of the present invention. All the components may be each implemented in an independent hardware, but a part or all of the respective components may be selectively combined to be implemented as a computer program having a program module performing some functions or all the functions combined in one or a plurality of hardware. Codes and code segments constituting the computer program may be readily inferred by a computer programmer in the field. In addition, the computer program may be stored in computer-readable recording media and may be read and executed by a computer, implementing the method of the present invention.

According to the above, even though the possible lane-change area does not exist, the ego vehicle is capable of changing lanes by cutting-in in front of other vehicles, and thus the lane change maneuver is performed in various traffic situations when necessary.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An autonomous driving control apparatus comprising:
   an environment detector configured to sense vehicle information on one or more vehicles running in a target lane; and
   a processor configured to:
   determine whether a possible lane-change area exists based on the vehicle information,
   determine a largest area among areas between target lane vehicles as a target lane-change area when the possible lane-change area does not exist,
   indicate an intention to change a lane to the target lane-change area to determine whether a target lane rear vehicle has a yield intention, and
   attempt to change the lane based on the determined result of whether the target lane rear vehicle has the yield intention.

2. The autonomous driving control apparatus of claim 1, wherein the vehicle information comprises a position, speed, and acceleration of the vehicle running in the target lane.

3. The autonomous driving control apparatus of claim 1, wherein the processor is configured to:
   determine a position of each target lane vehicle based on the vehicle information after a target lane entering time elapses,
   determine a distance between the target lane vehicles based on the determined position of each target lane vehicle,
   determine the area between the target lane vehicles as the possible lane-change area when the determined distance between the target lane vehicles is equal to or greater than a value, and
   determine the area between the target lane vehicles as an area impossible to change the lane when the determined distance between the target lane vehicles is smaller than a value.

4. The autonomous driving control apparatus of claim 3, wherein the processor is configured to:
   determine the determined possible lane-change area as the target lane-change area when a number of the determined possible lane-change areas is one.

5. The autonomous driving control apparatus of claim 3, wherein the processor is configured to:
   determine a possible lane-change area having a longest length among the determined possible lane-change areas as the target lane-change area when the number of the determined possible lane-change areas is two or more.

6. The autonomous driving control apparatus of claim 1, wherein the processor is configured to:
   generate a virtual target in a front of an ego vehicle based on a speed and an acceleration of a center position of the target lane-change area.

7. The autonomous driving control apparatus of claim 6, wherein the processor is configured to:

delete the virtual target when the target lane rear vehicle does not have the yield intention.

8. The autonomous driving control apparatus of claim 1, wherein the processor is configured to:
when the possible lane-change area does not exist, generate a lateral lane position maintaining path in which an ego vehicle moves laterally to a side of the target lane in consideration of a traffic flow in a driving lane of the ego vehicle, wherein the ego vehicle runs alongside the target lane or generate a lane intruding path, wherein the ego vehicle continuously approaches the target lane.

9. The autonomous driving control apparatus of claim 1, wherein the processor is configured to:
determine the yield intention based on a deceleration and an acceleration of a front vehicle and a rear vehicle in the target lane-change area.

10. The autonomous driving control apparatus of claim 9, wherein the processor is configured to:
return an ego vehicle to a center of a driving lane of the ego vehicle when the yield intention does not exist, and
control a driving speed of the ego vehicle to search for another target lane-change area.

11. An autonomous driving control method comprising:
detecting vehicle information on one or more vehicles running in a target lane;
determining whether a possible lane-change area exists based on the vehicle information;
determining a largest area among areas between target lane vehicles as a target lane-change area when the possible lane-change area does not exist;
indicating an intention to change a lane to the target lane-change area to a target lane rear vehicle;
determining whether the target lane rear vehicle has a yield intention; and
attempting to change the lane based on the determined result of the yield intention.

12. The method of claim 11, wherein the detecting the vehicle information includes detecting a position, speed, and acceleration of the vehicle running in the target lane using a radar and a camera.

13. The method of claim 11, wherein the determining the target lane-change area includes:
determining a position of each target lane vehicle based on the vehicle information after a target lane entering time elapses;
determining a distance between the target lane vehicles based on the determined position of each target lane vehicle;
determining the area between the target lane vehicles as the possible lane-change area when the determined distance between the target lane vehicles is equal to or greater than a value; and
determining the area between the target lane vehicles as an area impossible to change the lane when the determined distance between the target lane vehicles is smaller than a value.

14. The method of claim 13, wherein the determining the target lane-change area comprises determining the determined possible lane-change area as the target lane-change area when a number of the determined possible lane-change areas is one.

15. The method of claim 13, wherein the determining the target lane-change area comprises determining a possible lane-change area having a longest length among the determined possible lane-change areas as the target lane-change area when the number of the determined possible lane-change areas is two or more.

16. The method of claim 11, wherein the indicating the intention to change the lane to the target lane rear vehicle comprises:
generating a virtual target in a front of an ego vehicle based on a speed and an acceleration of a center position of the target lane-change area;
controlling a speed of the ego vehicle, wherein the ego vehicle runs parallel to a center of the target lane-change area by following the virtual target;
generating a cut-in intention path to the target lane-change area; and
performing a lateral control on the ego vehicle based on the cut-in intention path.

17. The method of claim 16, wherein the generating the cut-in intention path comprises generating a lateral lane position maintaining path in which the ego vehicle moves laterally to a side of the target lane in consideration of a traffic flow in a driving lane of the ego vehicle, wherein the ego vehicle runs alongside the target lane or generating a lane intruding path, wherein the ego vehicle continuously approaches the target lane.

18. The method of claim 11, wherein the determining the yield intention comprises determining the yield intention based on a deceleration and an acceleration of a front vehicle and a rear vehicle in the target lane-change area.

19. The method of claim 11, wherein the determining the yield intention comprises:
deleting a virtual target when the target lane rear vehicle does not have the yield intention;
returning an ego vehicle to a center of a driving lane of the ego vehicle; and
controlling a driving speed of the ego vehicle to search for another target lane-change area.

* * * * *